Figure 1:
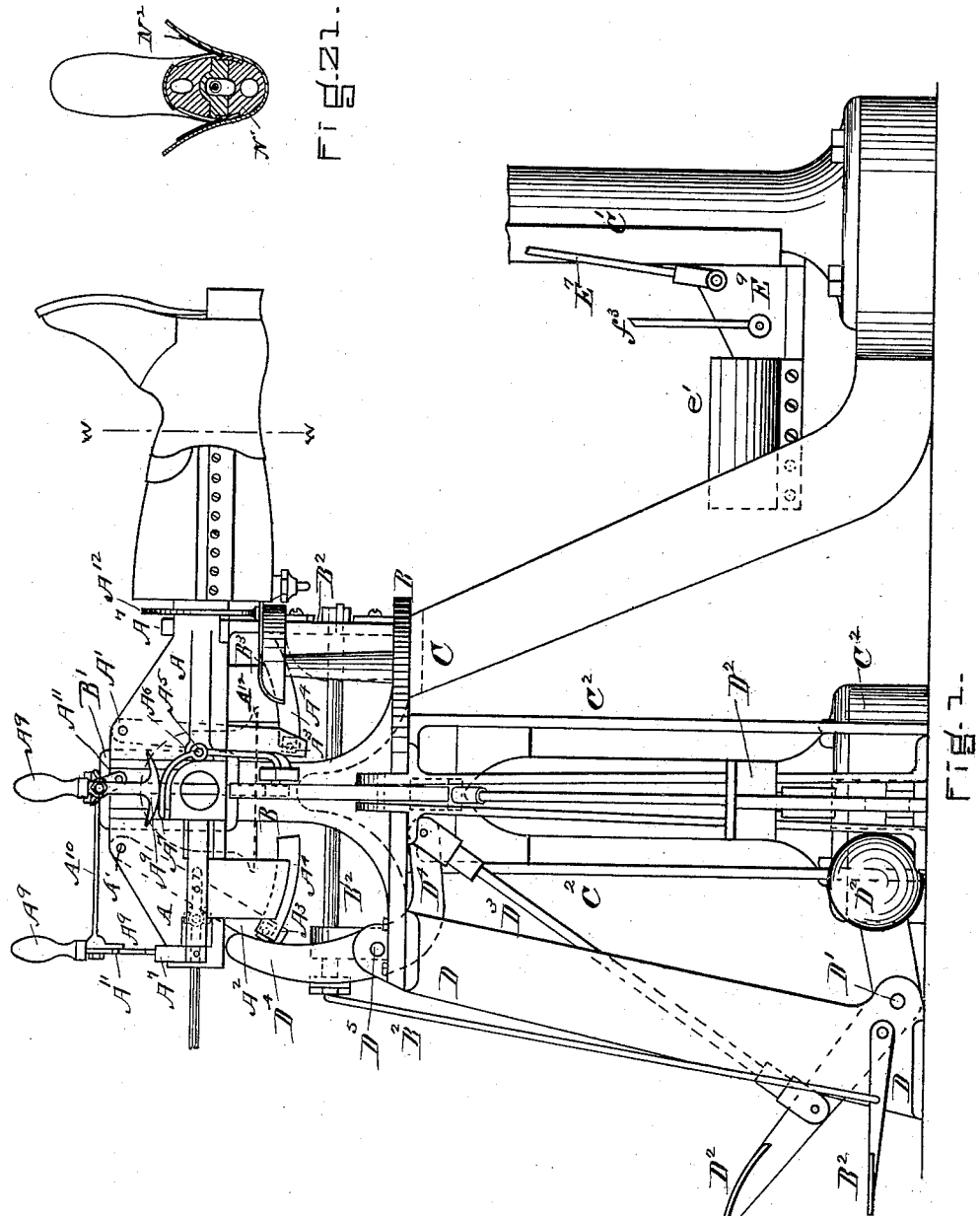

(No Model.) 13 Sheets—Sheet 1.

G. W. COPELAND & J. E. CRISP.
MACHINE FOR TREEING SHOES.

No. 383,279. Patented May 22, 1888.

WITNESSES.
Frank G. Parker.
Matthew M. Blunt.

INVENTORS.
Geo. W. Copeland,
J. E. Crisp.

(No Model.) 13 Sheets—Sheet 2.

G. W. COPELAND & J. E. CRISP.
MACHINE FOR TREEING SHOES.

No. 383,279. Patented May 22, 1888.

WITNESSES.
Frank G. Parker
Matthew H. Blunt

INVENTORS
Geo. W. Copeland
J. E. Crisp (No Model.) 13 Sheets—Sheet 3.

G. W. COPELAND & J. E. CRISP.
MACHINE FOR TREEING SHOES.

No. 383,279. Patented May 22, 1888.

WITNESSES.
INVENTORS.

(No Model.) 13 Sheets—Sheet 4.

G. W. COPELAND & J. E. CRISP.
MACHINE FOR TREEING SHOES.

No. 383,279. Patented May 22, 1888.

WITNESSES.
Frank G. Parker.
Matthew M. Blunt.

INVENTORS.
Geo. W. Copeland.
J. E. Crisp.

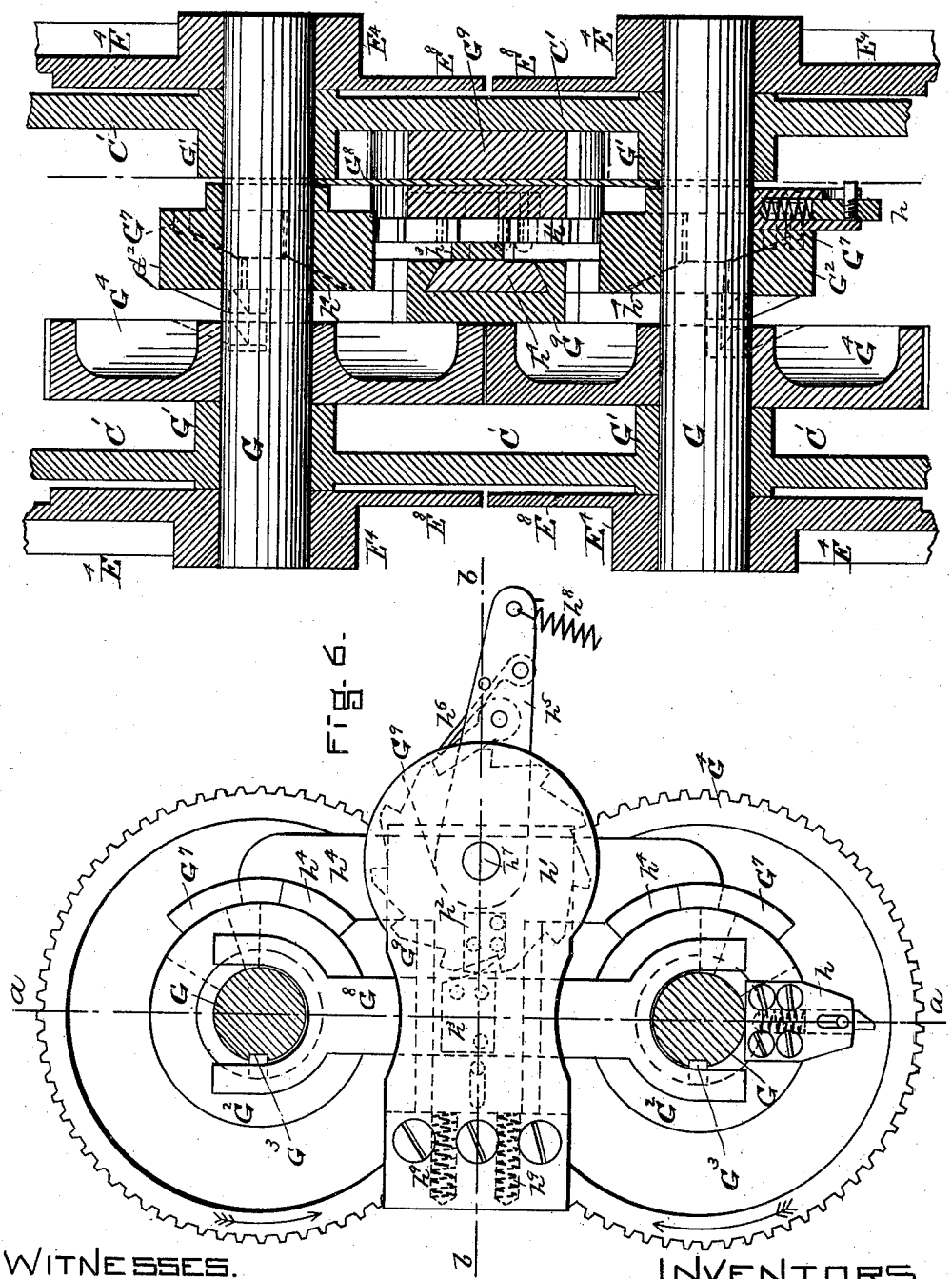

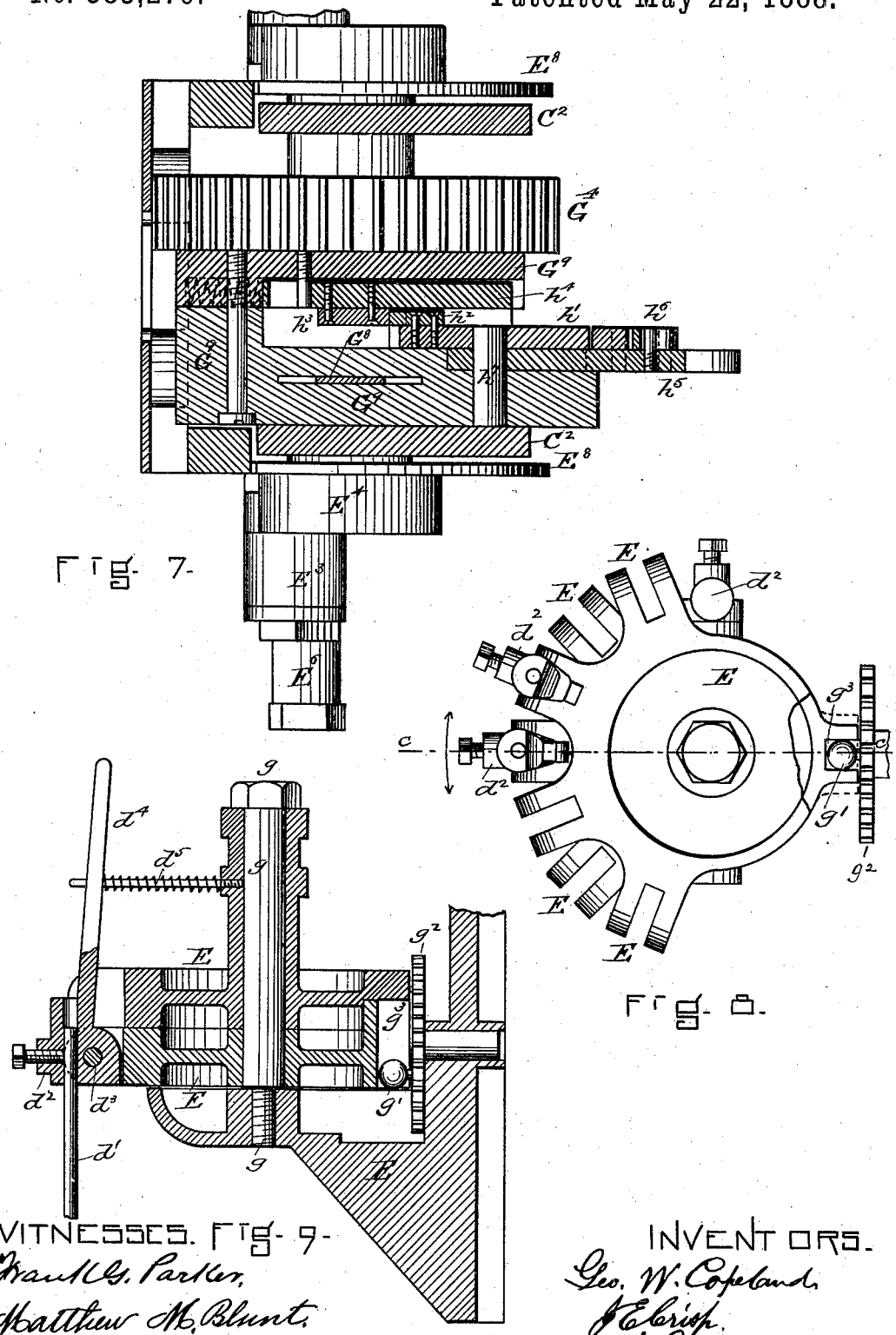

(No Model.) 13 Sheets—Sheet 7.

G. W. COPELAND & J. E. CRISP.
MACHINE FOR TREEING SHOES.

No. 383,279. Patented May 22, 1888.

WITNESSES.
Frank G. Parker
Matthew M. Blunt.

INVENTORS.
Geo. W. Copeland
J. E. Crisp.

(No Model.) 13 Sheets—Sheet 8.

G. W. COPELAND & J. E. CRISP.
MACHINE FOR TREEING SHOES.

No. 383,279. Patented May 22, 1888.

WITNESSES.
Frank G. Parker
Matthew M. Blunt

INVENTORS.
Geo. W. Copeland
J. E. Crisp (No Model.) 13 Sheets—Sheet 9.

G. W. COPELAND & J. E. CRISP.
MACHINE FOR TREEING SHOES.

No. 383,279. Patented May 22, 1888.

WITNESSES.
Frank G. Parker
Matthew M. Blunt

INVENTORS.
Geo. W. Copeland
J. E. Crisp (No Model.) 13 Sheets—Sheet 10.

G. W. COPELAND & J. E. CRISP.
MACHINE FOR TREEING SHOES.

No. 383,279. Patented May 22, 1888.

WITNESSES. INVENTORS.

(No Model.) 13 Sheets—Sheet 11.

G. W. COPELAND & J. E. CRISP.
MACHINE FOR TREEING SHOES.

No. 383,279. Patented May 22, 1888.

WITNESSES.
Frank G. Parker,
Matthew M. Blunt,

INVENTORS.
Geo. W. Copeland,
J. E. Crisp.

(No Model.) 13 Sheets—Sheet 12.
G. W. COPELAND & J. E. CRISP.
MACHINE FOR TREEING SHOES.
No. 383,279. Patented May 22, 1888.
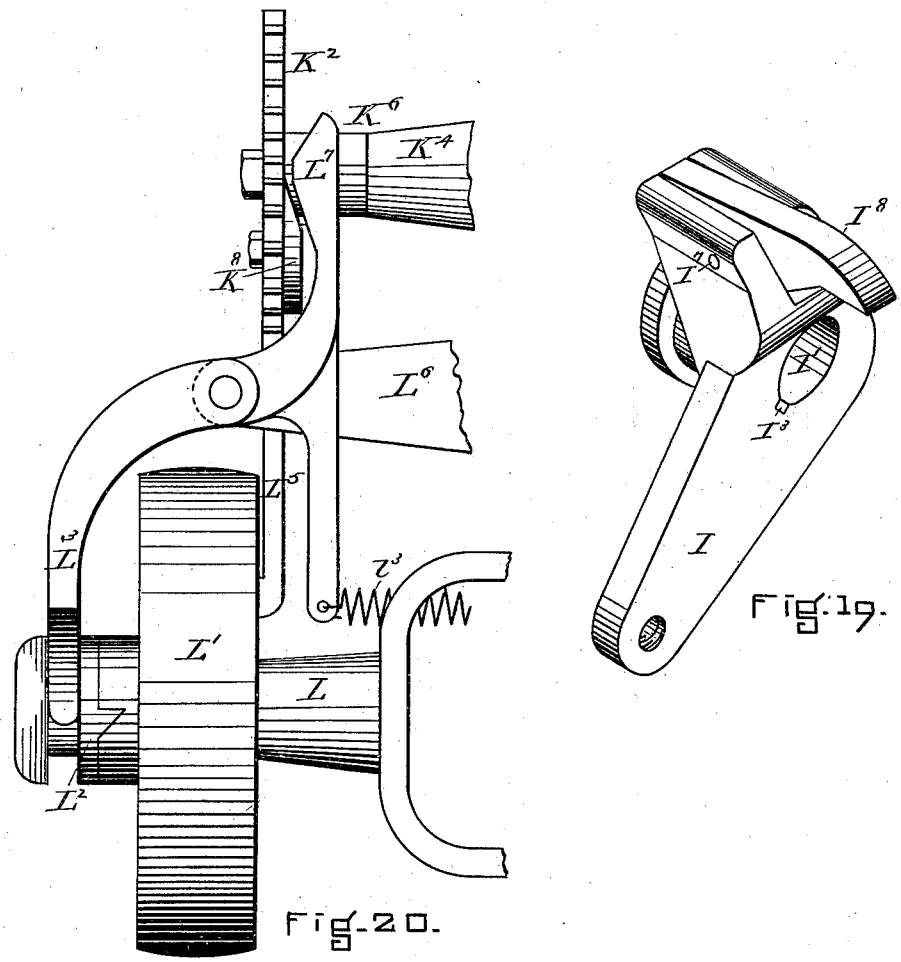
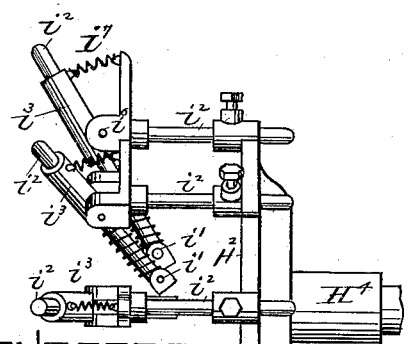
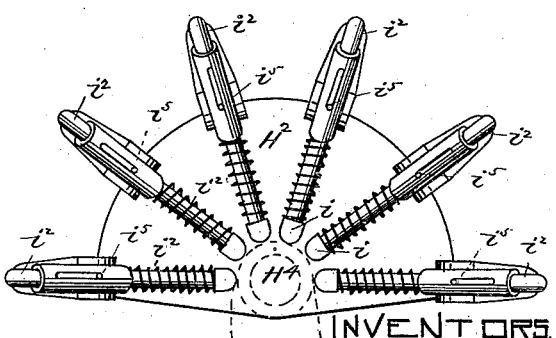
WITNESSES. INVENTORS.

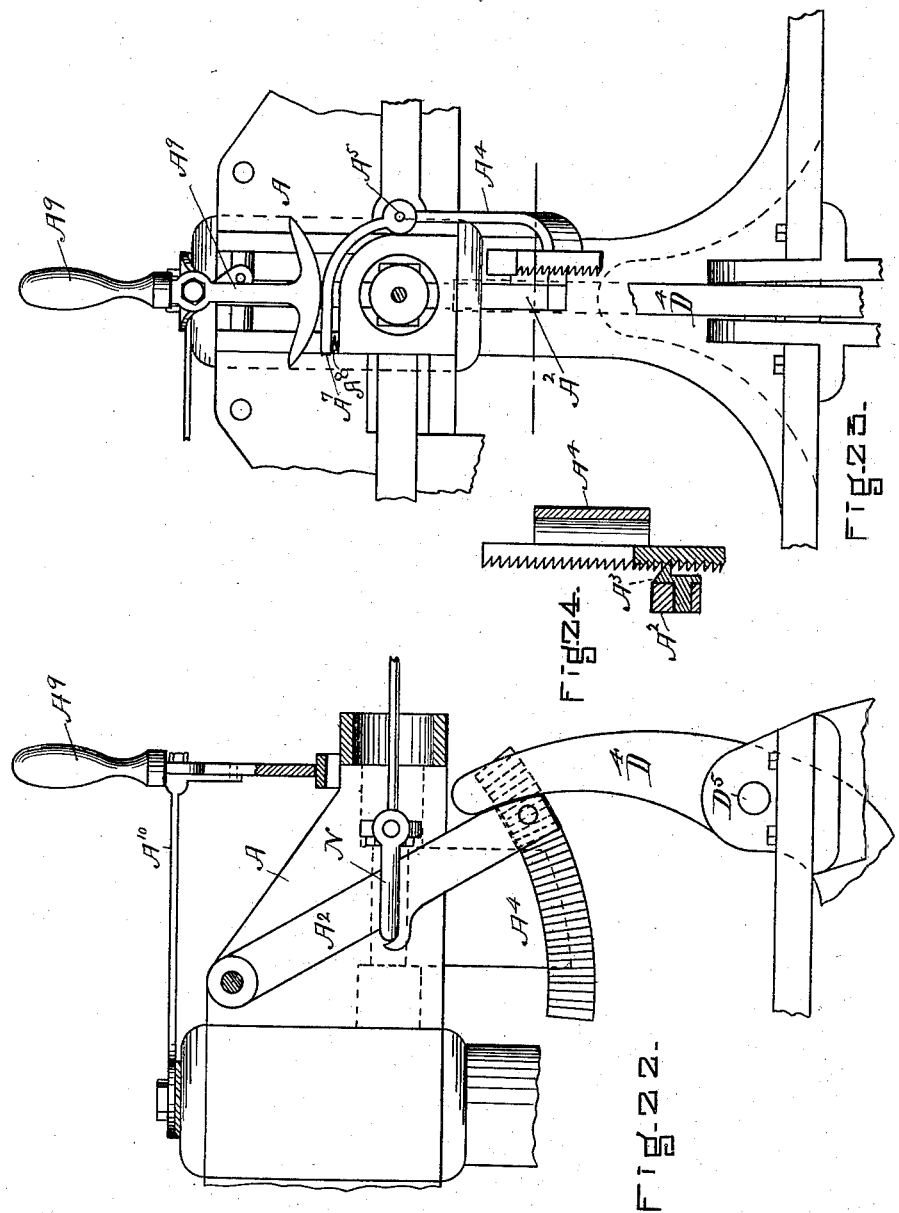

UNITED STATES PATENT OFFICE.

GEORGE W. COPELAND, OF MALDEN, AND JOSEPH E. CRISP, OF SOMERVILLE, ASSIGNORS, BY MESNE ASSIGNMENTS, TO DANIEL T. COPELAND, OF MALDEN, MASSACHUSETTS.

MACHINE FOR TREEING SHOES.

SPECIFICATION forming part of Letters Patent No. 383,279, dated May 22, 1888.

Application filed February 8, 1888. Serial No. 263,366. (No model.)

*To all whom it may concern:*

Be it known that we, GEORGE W. COPELAND, of Malden, and JOSEPH E. CRISP, of Somerville, both in the county of Middlesex and State of Massachusetts, both citizens of the United States, have invented new and useful Improvements in Machines for Treeing Shoes, of which the following is a full, clear, and exact description, reference being had to the accompanying drawings, forming a part of this specification, in explaining its nature.

The object of the invention is the production of a machine which will perform the laborious part of shoe-treeing while operators are engaged in putting on and taking off the shoes, and submitting them while in the trees and before and after the work done by the machine to such treatment and manipulation as it is apparently impracticable to do by any other than hand-labor.

It consists of the requisite number of shoe-trees mounted on a turret, which, by its revolution, presents them to power-driven rubbing-tools at proper intervals of time determined by the operator.

Figure 2:
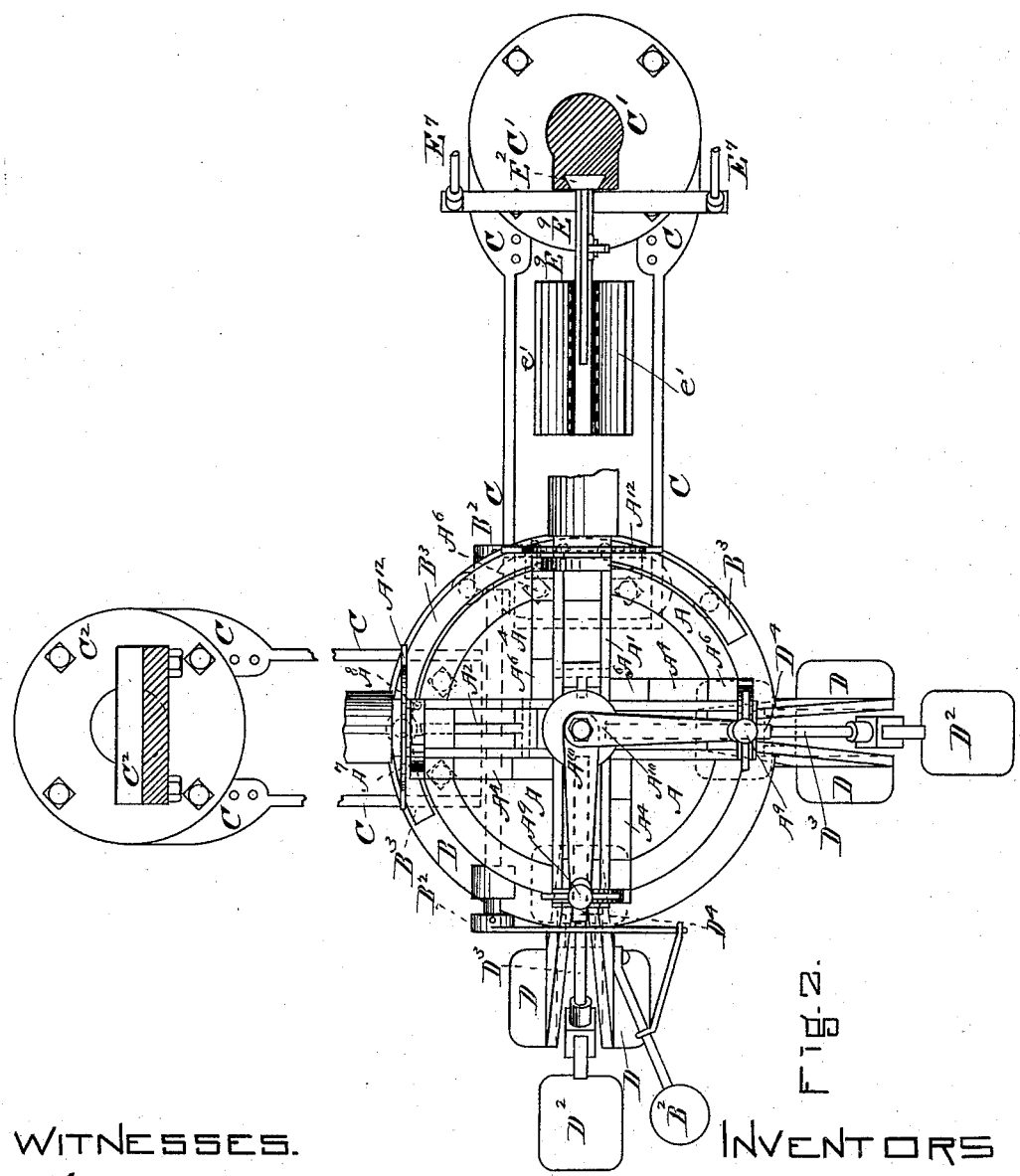
Figure 3:
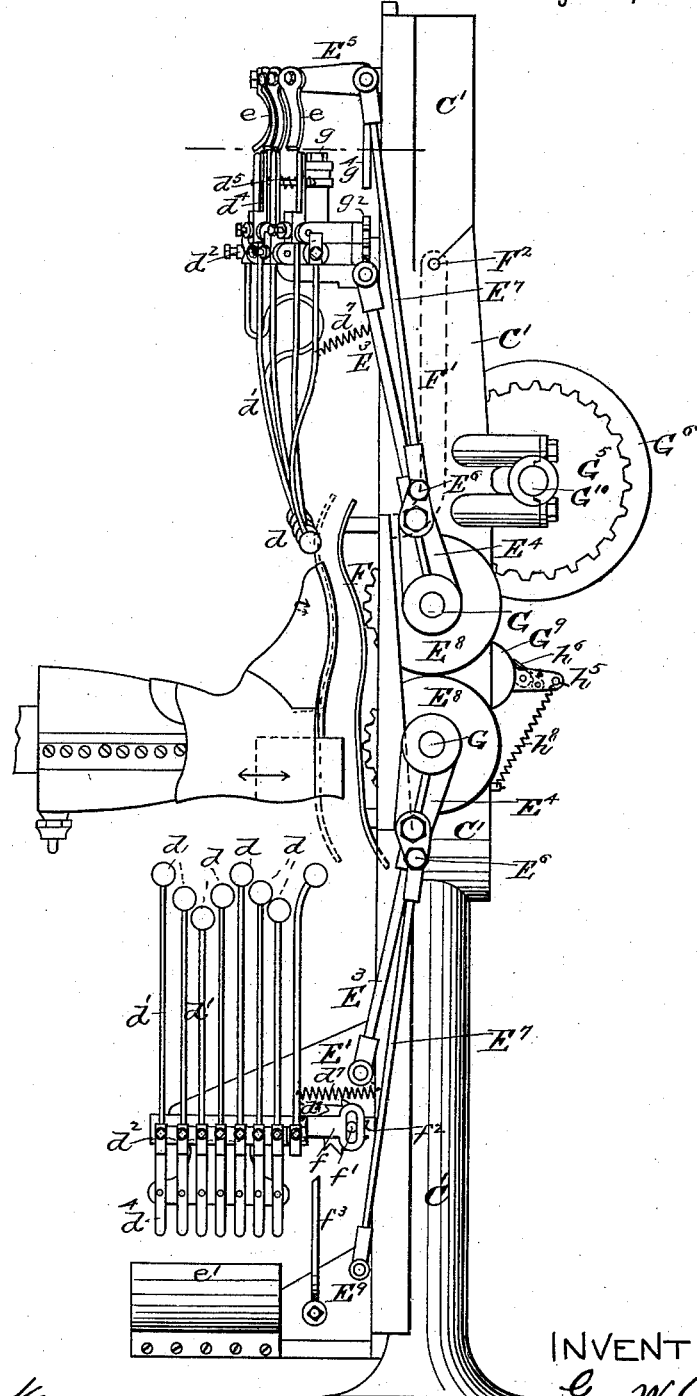
Figure 4:
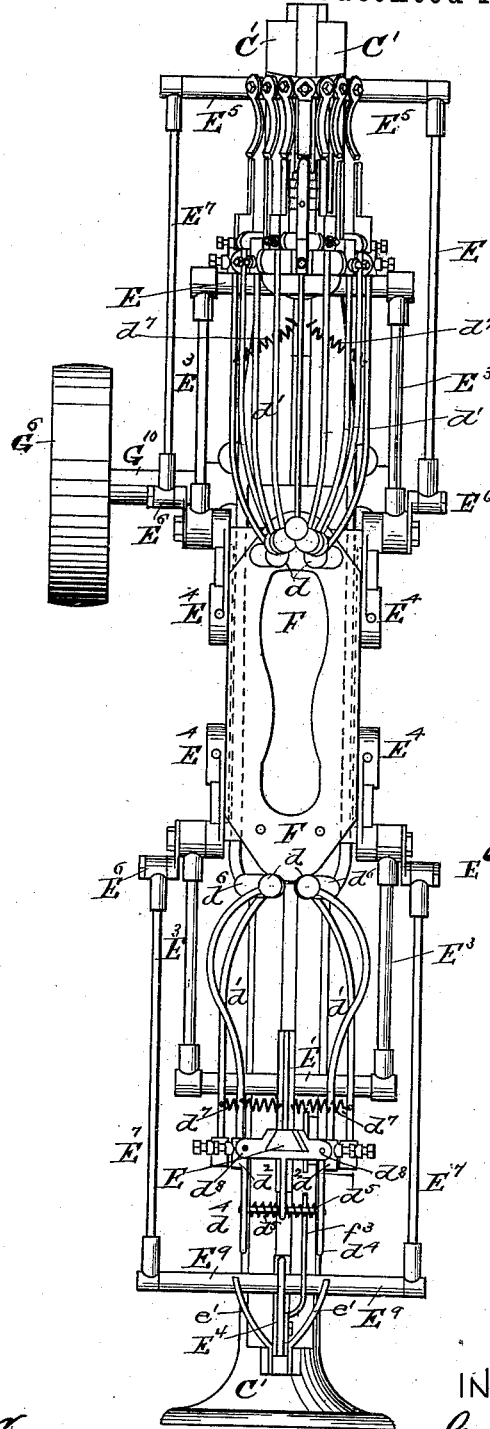
Figure 10:
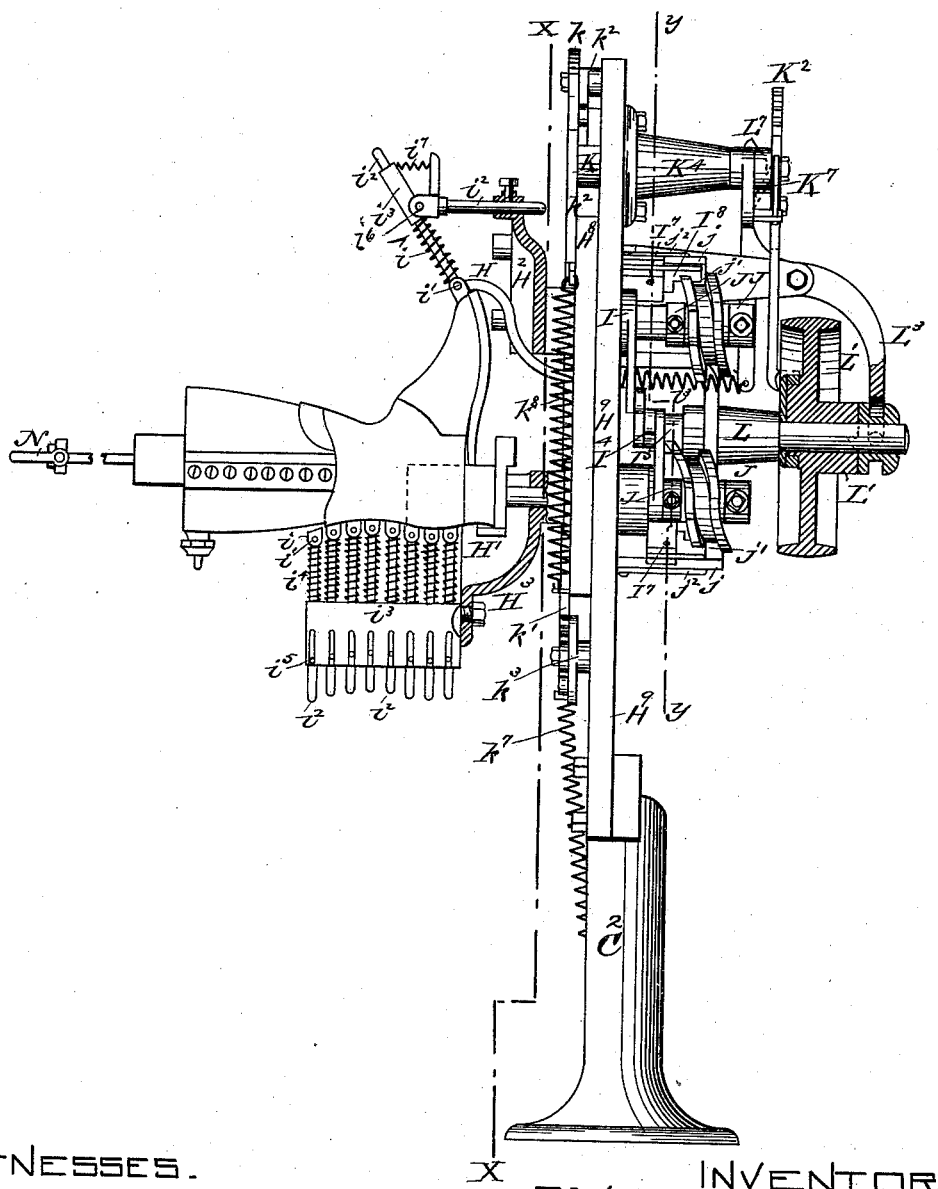
Figure 11:
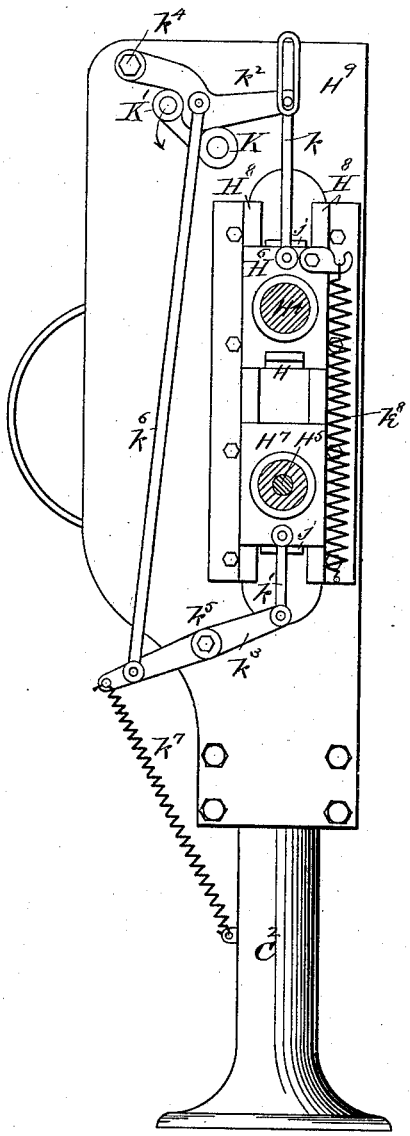
Figure 12:
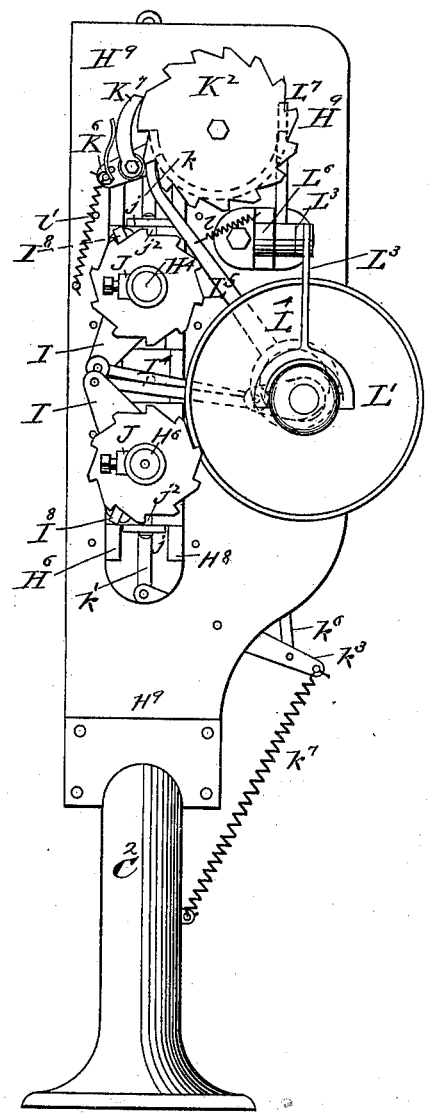
Figure 13:
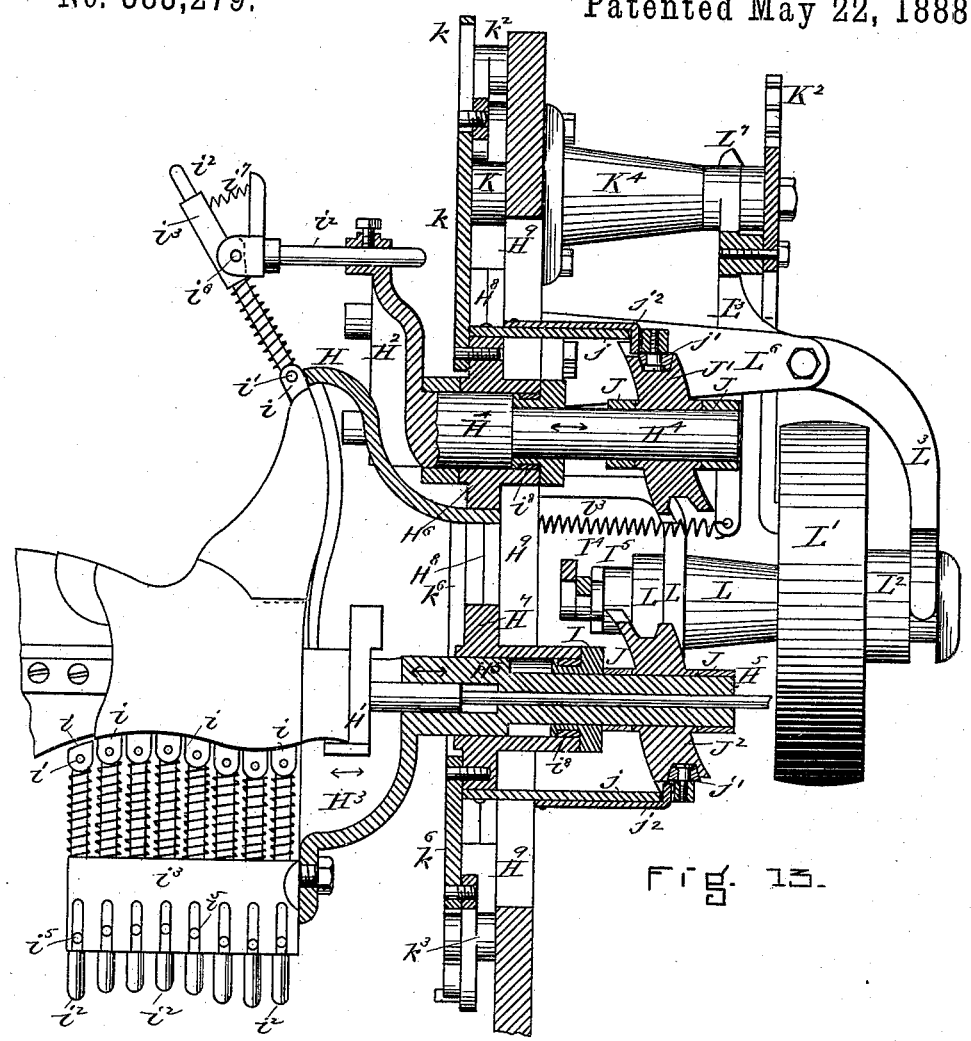
Figure 15:
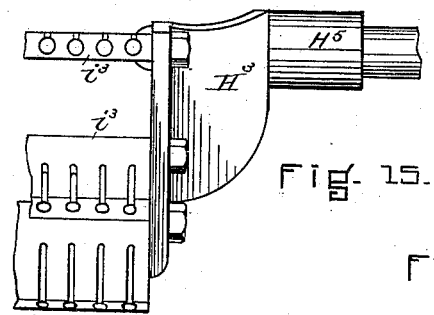
Figure 14:
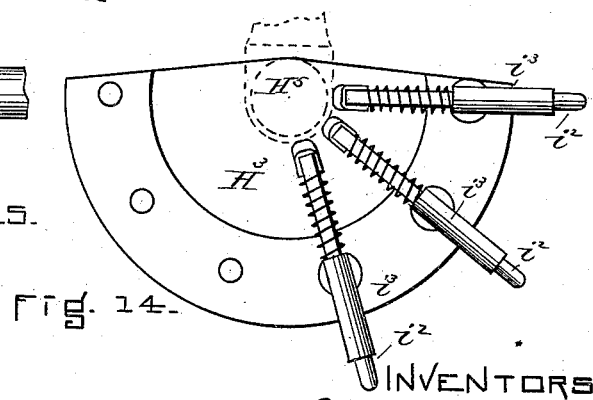
Figure 16:
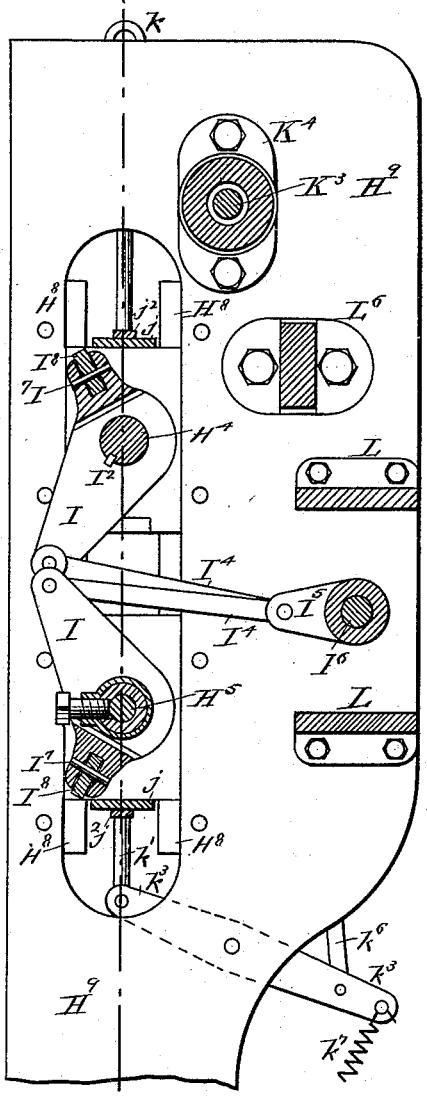

In the drawings, Figure 1 is an elevation showing the tree supporting, locking, and carrying mechanism. Fig. 2 is a plan view of Fig. 1. Fig. 3 is a side elevation of mechanism for rubbing the sides, foot, and front. Fig. 4 is a front elevation of Fig. 3. Fig. 5 represents details for the stopping and starting mechanism shown in Fig. 3. Fig. 6 is a section of Fig. 5 on the line $a\,a$. Fig. 7 is a section of Fig. 5 on the line $b\,b$. Fig. 8 is a plan of tool-carrying head E for the foot-tools. Fig. 9 is a section of Fig. 8 on line $c\,c$. Fig. 10 is a side elevation of mechanism for rubbing the back and toe. Fig. 11 is a front elevation of Fig. 10, with rubbing-tools removed, at line $x\,x$. Fig. 12 is a rear elevation of Fig. 10, showing operating mechanism. Fig. 13 is an enlarged vertical section of Fig. 10. Fig. 14 is a plan showing back-rubbing tools and carrier $H^3$. Fig. 15 is a side elevation of Fig. 14. Fig. 16 is an enlarged partial section of rear elevation of Fig. 12, cut on line $y\,y$ of Fig. 10. Fig. 17 is a plan view of toe-rubbing tools and carrier $H^2$. Fig. 18 is a side elevation of Fig. 17. Fig. 19 is a projective elevation of driving rocker-arms, showing feed-pawl $I^3$. Fig. 20 shows enlarged details of stopping and starting mechanism shown in Fig. 13. Fig. 21 shows improved tree-containing springs for holding back the sides or flaps of shoes, and is a section of Fig. 1 on line $w\,w$. Fig. 22 is a section of one of the turret-arms, showing the operation of lever $A^2$. Fig. 23 is a front end elevation of the same. Fig. 24 shows the relations of the swinging ratchet $A^4$ and the pawl $A^3$.

The turret A, Figs. 1 and 2, is made with sockets to receive the ordinary shoe-trees in the usual manner. Hung within this turret A at A' are the swinging bars $A^2$, which pass through the shackles N of the trees to spread and hold them spread when required. The lower end of these bars $A^2$ has a pawl, $A^3$, which engages the curved ratchets $A^4$ and holds these bars in any desired position. The curved ratchets $A^4$ are fixed on the rods $A^5$, which are provided with bearings in the turret at $A^6\,A^6$. To the outer end of these rods are fixed the levers $A^7$, which, by action of the springs $A^8$, cause the ratchets $A^4$ to engage with the pawls $A^3$ whenever the swinging cams $A^9$, carried on the counter-springs $A^{10}$, are swung by the operator away from their place over the lever A'. The counter-springs $A^{10}$ are fixed to the top of the post B, around which the turret revolves. The swinging cams $A^9$ are held against the revolving motion of the turret by the stops $A^{11}$. As the turret with the trees spread is revolved and stopped, the cams $A^9$ rest on the levers $A^7$. The pressure of the pawls $A^3$ against the teeth of the ratchets $A^4$ overcomes the tension of the counter-spring $A^{10}$, causing it to rise and remain up until the pressure between the pawl and ratchet is removed. The counter-spring then acts on the lever $A^7$, causing the ratchet $A^4$ to move from the pawl $A^3$, thus allowing the bar $A^2$ free motion until the swinging arm $A^9$ is moved from over lever $A^7$.

The turret A, which revolves around the post B, is held thereon by the bolt and washer B'. The lower part of this post B is spread out to carry a lock, $B^{2\times}$, for holding the turret in its stationary position. This lock, operated by foot, requires no special description.

There is also a semicircular stand, B³, which serves to hold the foot of the trees in correct position for the action of the rubbing-tools. Fixed to the trees next to the turret are the plates A¹², with elongated faces. The stand B³ is so placed that the trees are free to be turned by hand where the operators stand, and its ends are so rounded that if the trees are not correctly positioned by the operator within certain limits the revolution of the turret A causes the elongated face of the plates A¹² to strike one of the rounded ends of the stand B³ and roll the tree into correct position, and remain there until removed from over B³. The post B is mounted upon legs C C D D, as shown in Figs. 1 and 2, the legs C C carrying the rubbing and the legs D D carrying the jacking or spreading mechanism. Through the lower part of the legs D D are the fulcra D′ D′ of the counterbalanced treadles D² D², which are connected by the rods D³ D³ to the bell-crank levers D⁴ D⁴. These levers are pivoted at D⁵ D⁵. The counter-balances keep these parts when free in their extreme backward position, so that when the turret A is revolved the lower ends of bars A² A², wherever their position, will pass clear of the upper end of the bell-cranks D⁴ D⁴, and, deposing the treadle D², will cause the upper end of the bell-cranks D⁴ D⁴ at some part of their forward motion to exert pressure upon bars A² and jack or unjack a shoe as required.

Adjustable on one of the legs C is the stand C′, Figs. 3, 4, 5, 6, 7, 8, 9, which stand supports the operating mechanism for rubbing the sides, front, and foot of a shoe by vertically-reciprocating motion. A tool-face, $d$, is shaped so as to be adapted to the section upon which it is intended to work. It is secured to a rod, $d′$, which rod can be adjusted at will for length in the socket or sleeve $d²$, the socket $d²$ being itself pivoted at $d³$ to the reciprocating head E. On this socket above the pivot $d³$ is extended the bar $d⁴$, which, about midway of its length, engages with the spring $d⁵$. This spring $d⁵$ holds the tool-face $d$ up to its work on the shoe. The part of the socket pivoted to head E forms a stop, (see Fig. 9,) which prevents the spring $d⁵$ from throwing the tool-face $d$ beyond the point at which it rests when it is in position to begin its rubbing upon the shoe. (See Fig. 4.)

The heads E E′ are guided by the grooves E² in the stand C′. They are reciprocated by the connecting-rods E³ and the cranks E⁴. The tool-faces $d$ are adjustable for the kind of work they are to perform. Sometimes they move to a fixed line on the shoe and return, and sometimes they move beyond the part of the shoe they are desired to rub and then return. In the latter case the tool-face $d$ must be raised above and away from the edge of the leather until it has returned far enough to prevent contact with the edge of the leather and doing injury to the shoe. To accomplish this we use the heads E⁵ E⁹, driven by the cranks E⁶ and the connecting-rods E⁷. These cranks E⁶ are fixed outside of cranks E⁴ and are set back in time five or ten degrees behind the cranks E⁴. These cranks E⁶ cause the heads E⁵ E⁹ to travel about one-third farther than the heads E E′, resulting in this: that when the heads E E′ have reached the extreme limit of forward motion, the heads E⁵ E⁹ are moving slowly toward them.

The curved pieces or cams $e$ and $e′$ are attached to E⁵ E⁹. These pieces engage with the extensions $d⁴$ of sockets $d²$, and they are shaped to act on the extensions $d⁴$ by the different motions of the heads E⁵ E⁹, and thus to raise and hold the tool-faces governed by the extensions $d⁴$ away from the tree and leather the desired distance and time. These curved pieces could be so shaped that the tool-faces could be made to follow the contour of the tree during the whole of their motions. The tool-faces $d⁶$, Fig. 4, work next to the rand-line. They are pivoted in sockets like $d²$ without its extension, and these sockets are so pivoted to the heads E E′ that they have a motion at right angles to that given by the pivots $d³$. These tools are so arranged that they can follow the curve of the rand or the curve of the tree. The motions of the joints of these tools are limited by stops $d⁸$, the springs $d⁷$ acting against the stops at about an angle of forty-five degrees. The tool-faces $d⁶$ are prolonged so as to permit them to ride on the plate F, when the action of the feed moves them toward it. This plate F is a thin plate of metal having an opening large enough to admit the sole of the largest shoe of the series for which it is designed. It is curved to the average rand-line of that series and attached to the swinging frame F′, hung at F² on the stand C′. This swinging frame F′ carries the plate over the sole the proper distance, as shown by the dotted lines, Fig. 3, so as to allow the tools $d⁶$ to act nearly down to the rand-line of the shoe.

When the machine is in operation, the partial disks E⁸, connected to cranks E⁴, act against the back edges of the swinging frame F′, as will be understood by reference to Fig. 3, and keep the plate F in correct position.

Figs. 3 and 4 show the cams $e′$ made in one piece and shaped to the part of the tree they work under. They are fixed to the differential head E⁹ to operate when desired the tool-faces carried by the head E′. The feeding device of the tools carried by head E′ is the slotted piece $f$, attached to the sliding part of the head E′, and the crank $f′$, fixed on the ratchet $f²$, having its bearing on the fixed part of the head E′. This ratchet is moved one tooth each time the head E⁹ is nearest head E′ by the pawl $f³$, fixed on head E⁹.

Figs. 3, 8, and 9 show the feeding device of the tools carried by the head E. These tools are swung around the bolt $g$ as a center by the crank $g′$, driven by the ratchet $g²$, having its bearing in the fixed part of head E, the pawl $g⁴$, fixed at head E⁵, operating the ratchet $g²$. The crank $g′$ operates in the slot $g³$.

The cranks $E^4$ $E^6$, Figs. 3, 5, 6, and 7, are fixed to the shafts G, which have their bearings at G' on the stand C'. These shafts are driven by the clutches $G^2$, which slide on feathers set in them. The clutches engage at the proper times with their counterparts formed in the clutch-gears $G^4$, these gears having constant motion from the gear $G^5$ and pulley $G^6$, carried on the main shaft $G^{10}$. When the gears $G^4$ are in motion and the clutches $G^2$ in gear, the operation of stopping and starting is as follows: Fixed to one of the clutches $G^2$ is the revolving spring-pawl $h$, which at each revolution of clutch $G^2$ moves the ratchet-wheel $h'$, carried on the stand $G^9$, one tooth forward. Whenever $h'$ has moved the proper number of teeth the incline $h^2$, which is fixed upon it, engages with incline $h^3$, an incline fixed upon the double-curved wedge $h^4$, and moves and holds the curved wedges $h^4$ close to the clutches $G^2$. In the correct position on the circumference of the clutches $G^2$ to draw them out of gear from $G^4$ are fixed the inclines $G^7$. As these inclines revolve over the curved wedges $h^4$ the clutches are forced back against the spring $G^8$ and withdrawn from contact with $G^4$, leaving the cranks $E^4$ in the desired position and the wedges $h^4$ locked in position. To start the mechanism, there is provided the lever $h^5$, carrying a spring-pawl, $h^6$, which pawl engages with the ratchet-teeth of ratchet-wheel $h'$ at all times, acting as a retainer to prevent incline $h^2$ from moving back. This lever $h^5$ moves around the same pin $h^7$, around which the ratchet $h'$ revolves. It is held back by the spring $h^8$. The motion of this lever $h^5$ is so limited that it can only be swung a little more than the angle of one ratchet-tooth. (See dotted line, Fig. 5.) When we swing lever $h^5$ its limit, the ratchet $h'$ moves one tooth and the inclines $h^2$ $h^3$ pass by each other, leaving the springs $h^9$, behind the curved wedges $h^4$, free to move those wedges from under the incline $G^7$, thus allowing the spring $G^8$ to move one of the clutches $G^2$ into its counterpart in one of the clutch-gears $G^4$, resulting in one of the tool-carrying heads moving toward the shoe. When this head has reached its full inward movement, the other clutch drops in and the heads move in unison until they have performed the set number of strokes, when they stop, as before.

To insure the feeding devices stopping at the same position each time, the ratchet $h'$ is made with one more tooth than the feeding-ratchets $f^2$ $g^2$, for there is one tooth of ratchet $h'$ not moved by pawl $h^6$.

The stand $C^2$, Figs. 10 to 20, carries the toe and back rubbing tools. These tools move apart to allow the trees to be moved, as do those for the sides and front, and oscillate about sixty degrees, their center of oscillation being adjusted to the length of the shoe by the rests H H' contacting with the toe and heel. The tool-faces $i$ are pivoted at $i'$ to the spindles $i^2$. These spindles slide in the bearings $i^3$, and the tool-faces $i$ are pressed against the shoe by the springs $i^4$, around the spindles between the tool-faces and the ends of the bearings. Stops $i^5$ regulate the forward motions of the spindles $i^2$. The tools for the toe have their bearings pivoted at $i^6$, and the springs $i^7$ give angular elasticity to these tools when working down on the toe, stops limiting the motion around the pivots $i^6$. The tools are mounted on carriers $H^2$, Figs. 17 and 18, and $H^3$, Figs. 14 and 15, arranged as shown. If the shape and length of the leg part of the shoe require it, any number of tools can be removed from carrier $H^3$. The carriers $H^2$ $H^3$ are provided with pivots or shafts $H^4$ $H^5$. These pivots move in bearings $H^6$ $H^7$, and the bearings have vertical motions in the slides $H^8$, which are fixed to the plate $H^9$ of the stand $C^2$. Figs. 10, 12, 13, 16, and 19 show the means for oscillating the tool-carriers $H^2$ $H^3$. Fixed in the bearings $H^6$ $H^7$ by the keepers $i^8$, so that they can oscillate, are the levers or clamps I. Fitted to the levers I at I' are the small parts of the pivots $H^4$ $H^5$, which are free to slide forward and backward on feathers $I^2$, fitted to the keyways $I^3$. To the outer end of the levers I are jointed the connecting-rods $I^4$, the opposite ends of these rods being jointed to the common crank $I^5$, fixed on the main shaft $I^6$. Fig. 16 shows how the revolution of crank $I^5$ oscillates the levers I and the parts fixed to them. The feeding of these tools is accomplished by the pivots $H^4$ $H^5$ sliding in and out through the bearings $H^6$ $H^7$ and levers I, when the levers are moving, by the following mechanism, as shown in Figs. 10, 12, 13, 16, and 17: Fixed on the small part of pivots $H^4$ $H^5$, between the collars J, so that they are free to revolve, are the cams $J'$ $J^2$, whose paths are shaped to give the desired forward and backward movements to the pivots. One side of the cam-paths is provided with the desired number of ratchet-teeth. Fixed to the bearings $H^6$ $H^7$ are the bars $j$ $j$, with the cam rolls $j'$ $j'$ at their outer ends and the retainer-pawls $j^2$ $j^2$ passing through them over the ratchet-teeth. Pivoted to the lever I at I' is the feed-pawl $I^8$, held down in the ratchet-teeth of cams $J'$ $J^2$ by a spring. (Not shown.) These feed-pawls $I^8$ at each full oscillation of the lever I move the ratchets one tooth. The ratchets following the curve of the cams and the rolls being fixed, the relations of the feed and retainer pawls with the ratchet-teeth remain unchanged as the cams move the pivots $H^4$ $H^5$ in and out the desired distance.

Figs. 10, 11, 12, 13 show the devices used to move the tools to and from their operative positions. Bearings $H^6$ $H^7$ and their respective mechanisms, with a common source of motion, the crank $I^5$, are moved to and from each other in the slide $H^8$ by the links $k$ $k'$, Fig. 11. These links are connected to the levers $k^2$ $k^3$, which levers are pivoted to the plate $H^9$ at $k^4$ $k^5$, lever $k^3$ being connected to lever $k^2$ by the rod $k^6$, as shown. The lever $k^3$ has the counterbalance-spring $k^7$ of the desired tension to depress the tools carried by carrier $H^3$ to their work, a spring, $k^8$, acting directly for carrier $H^2$. The slot in the link $k$ provides for the varying length of shoes. The crank K, revolved under the lever $k^2$ by the ratchet $k^2$ at the proper time, brings its roll K' in contact with the lever $k^2$, and by successive steps raises lever $k^2$ to its highest position, and drawing bearings $H^6$ $H^7$ apart, as will be clearly understood from Fig. 11, crank K then stopping its motion.

In the stand L the main shaft $I^6$ has its bearing, with the crank $I^5$ fixed to its inner end. (See Figs. 10, 13, 16.) Outside of this bearing the driving-pulley L' runs. A clutch, $L^2$, fixes pulley L' to the shaft at the proper times. On the inside of this pulley L', which is always moving when the machine is in operation, is formed the eccentric $L^4$. This eccentric causes the long pawl, $L^5$, to move the space of one tooth of the ratchet $K^2$ at each revolution of the pulley L', pawl $L^5$ being held to the ratchet by the spring $l$.

If it is desired that the tools operate ten full strokes on the shoe, the ratchets on the cams J must have ten teeth. Then to use the time represented by three revolutions of pulley L' for the tools to move down and start and two revolutions of pulley L' for the tools to stop and move away, the ratchet $K^2$ should be spaced for fifteen teeth, with one left blank, as shown in Fig. 12. Ratchet $K^2$ and crank K are fixed on the shaft $K^3$, which revolves in the stand $K^4$, which is fixed on plate $H^9$. Between the stand and the ratchet $K^2$ is mounted on the shaft $K^3$ the lever $K^6$, carrying the retainer-pawl $K^7$, the lever $K^6$ being held back against a stop (not shown) by the spring $l'$. The clutch-lever is pivoted to the stand $L^6$ and drawn in by the spring $l^3$. On the side of the ratchet $K^2$ is formed the elevated semi-circle $K^8$, whose ends terminate with inclines, Figs. 10, 12, 20. This semi-circle $K^8$, by contact with the incline $L^7$ of the clutch-lever, forces the clutch away from the pulley L', as will be clearly seen, Fig. 20.

When the crank K is holding the tools farthest apart, the long pawl $L^5$ is moving backward and forward over the blank space of ratchet $K^2$. Raising the lever $K^6$ causes the ratchet $K^2$ to revolve one tooth, the long pawl $L^5$ coming into action. At the end of two revolutions of the driving-pulley L' the heel and toe rests H H' are resting on the shoe, and the inclined end of the semi-circle $K^8$ has passed clear of the incline $L^7$ on the clutch-lever $L^3$. When the spring $l^3$ has drawn the clutch $L^2$ into L' and the crank $I^5$ has made ten revolutions, the inclined semi-circle, which is moved by the ratchet $K^2$, forces the clutch out of gear just as the roll K' on the crank K is brought in contact with the lever $k^2$. The remaining teeth of the ratchet move the tools apart and the pawl $L^5$ moves again over the blank space of the ratchet.

The shoe trees N' are provided with springs $N^2$, Fig. 21. These springs when at rest hold the side of the shoe. The object of these springs is to permit the tools which are carried by the head E, and which work from the end of the toe toward the end of the tongues, to work to the ends and sides of the tongue without coming in contact with the flap sides of the shoe. These springs have their tension so regulated that they yield to the pressure of the tools carried by the head E', so that these tools can finish the side or flap part of the shoe by their motion from the heel part of the shoe toward the toe.

Having thus fully described our invention, what we claim as new, and desire to secure by Letters Patent of the United States, is—

1. In a shoe-treeing machine, the yielding toe and back rubbing tools mounted on pivoted shafts, and adapted by mechanism, substantially as described, to be automatically adjusted to and from each other, and to be oscillated substantially as and for the purpose set forth.

2. In a shoe-treeing machine, the mechanism for rubbing the sides and front of a shoe, comprising a series of adjustable spring-actuated rods or arms with proper rubbing tools or faces mounted on reciprocating heads, and mechanism for giving said heads differential motion, substantially as set forth.

3. A shoe-treeing machine comprising a revolving turret carrying shoe-trees, mechanism, substantially as described, for rotating the same and expanding the trees, a stand carrying toe and back rubbing tools mounted on pivoted shafts and adapted to be adjusted toward and from each other and oscillated, and an independent stand carrying side and front part rubbing mechanism supporting a series of adjustable spring-actuated rods provided with tools or faces mounted on reciprocating frames or slides having differential motion, and suitable operating mechanism, substantially as described.

4. In a machine for treeing shoes, in combination with the turret, the swinging bars $A^2$, and a pawl and ratchet to spread and carry spread the trees mounted on the sections of the turret.

5. In a machine for treeing shoes, in combination with the turret carrying one or more shoe-trees, the counterbalanced treadle $D^2$, its rod $D^3$, and the bell-crank lever $D^4$, operating as described.

6. In a machine for treeing shoes, the combination of the tool-carrier and tool-governing heads operated by differential cranks $E^4$ $E^6$, revolving around a common center.

7. In a machine for treeing shoes, the rand-guide F, constructed and operating substantially as shown and described, and for the purposes set forth.

8. In a shoe-treeing machine, a thin metal sole plate, which acts as a rand-guide, attached to a swinging frame, in combination with partial disks to hold the swinging frame in operative position when they are revolving, substantially as described, and for the purposes set forth.

9. In a shoe-treeing machine, a time-ratchet provided with one more tooth than the feeding-ratchets for the tool-carrying slides or frames, and operative mechanism therefor, substantially as described.

10. In a machine for treeing shoes, cranks $E^4$, shafts G, clutches $G^2$, pawl $h$, ratchet $h'$, inclines $h^2 h^3$, wedges $h^4$, and springs $h^9$, in combination with the clutch-gears $G^4$ and inclines $G^7$, operating as described.

11. In a machine for treeing shoes, the spring $G^8$, in combination with the clutches $G^2$, substantially as set forth.

12. In a machine for treeing shoes, the lever $h^5$, the spring-pawl $h^6$, and the spring $h^3$, in combination with the ratchet $h'$, for the purposes set forth.

13. In a machine for treeing shoes, the tool-carriers $H^2 H^3$, having the line of the pivots around which they oscillate located for operative position by the rests H H' at a predetermined distance from the heel and toe ends of the shoe, substantially as described.

14. In a machine for treeing shoes, the tool-carriers $H^2 H^3$, carrying toe and back rubbing tools, and oscillated by mechanism, substantially as described.

15. In a machine for treeing shoes, the tool-carriers $H^2 H^3$, reciprocated horizontally by mechanism, substantially as shown and described.

16. In a machine for treeing shoes, a ratchet-wheel and operative mechanism for timing its operation, provided with a blank space, for the purposes set forth.

17. In a machine for treeing shoes, a ratchet, $K^2$, for timing its operation, in combination with the feeding-ratchets or the cams $J' J^2$, as set forth.

18. In a machine for treeing shoes, the elevated arc $K^8$, the clutch-lever $L^3$, having the inclined end $L^7$, and the spring $l^3$, in combination with the clutch $L^2$ and pulley $L'$, all operating as described, and for the purposes set forth.

19. In a machine for treeing shoes, the eccentric $L^4$ and the pawl $L^5$, in combination with the ratchet $K^2$ and the lever $K^6 K^7$ and spring $l'$, substantially as described, and for the purposes set forth.

20. In combination with a machine for treeing shoes, a tree provided with springs $N^2$, operating substantially as described, and for the purposes set forth.

21. In a machine for treeing shoes, the carriers for the treeing-tools, mounted upon pivots upon which they oscillate, adjusted automatically by means of heel and toe rests at predetermined distances from the heel and toe ends of the shoe, substantially as described.

GEO. W. COPELAND.
J. E. CRISP.

Witnesses:
FRANK G. PARKER,
MATTHEW M. BLUNT.